United States Patent
Liu et al.

(10) Patent No.: US 7,046,984 B2
(45) Date of Patent: May 16, 2006

(54) METHOD FOR RETRIEVING VOCABULARY ENTRIES IN A MOBILE PHONE

(75) Inventors: Xi-Yu Liu, Shanghai (CN); Dai-Shui Ho, Taipei Hsien (TW); Shih-Kuang Tsai, Taipei Hsien (TW)

(73) Assignee: Inventec Appliances Corp., Taipei (TW)

( * ) Notice: Subject to any disclaimer, the term of this patent is extended or adjusted under 35 U.S.C. 154(b) by 524 days.

(21) Appl. No.: 10/065,905

(22) Filed: Nov. 28, 2002

(65) Prior Publication Data

US 2004/0198321 A1   Oct. 7, 2004

(51) Int. Cl.
  *H04B 1/38* (2006.01)
(52) U.S. Cl. .................... 455/403; 704/10; 455/414.1
(58) Field of Classification Search ............ 379/88.06, 379/88.05; 455/66, 403; 704/2, 4, 5, 8, 704/10; 713/187, 182, 190, 191, 192; 711/105, 711/147, 159, 161, 162, 205, 206; 714/100, 714/19, 701, 719, 735, 737, 798; 726/2
See application file for complete search history.

(56) References Cited

U.S. PATENT DOCUMENTS

| 6,058,166 | A  | * | 5/2000 | Osder et al. ............. 379/88.22 |
| 6,192,344 | B1 | * | 2/2001 | Lee et al. .................... 704/277 |
| 6,760,411 | B1 | * | 7/2004 | Dybedokken et al. ... 379/88.06 |
| 6,907,431 | B1 | * | 6/2005 | Lin ............................ 707/102 |

* cited by examiner

*Primary Examiner*—Fan Tsang
*Assistant Examiner*—Ming Chow
(74) *Attorney, Agent, or Firm*—Winston Hsu

(57) ABSTRACT

A method for retrieving vocabulary entries in a mobile phone is disclosed. The mobile phone includes a screen and a text file. The text file has a plurality of vocabulary entries. Each vocabulary entry is stored in a number of languages in the same text file. The method includes opening files according to the number of languages in the text file, storing vocabulary entries expressed in the same language in the same file, giving a same index for every vocabulary entry having the same meaning expressed in different languages, according to the index retrieving the vocabulary of the same meaning expressed in a different language in one of files, and displaying the vocabulary entry on the screen.

5 Claims, 2 Drawing Sheets

| Amount of shift (byte) | Structure definition | Content (example) | Notation |
|---|---|---|---|
| 0000–0011 | typedef struct tagUIStringRSHeader { UINT32 NumberOfLanguage; LANGHEADERENTRY \ HeaderEntry[1]; } StringRSHeader; typedef struct tagUILangHeaderEntry { UINT32 LangID; INT32 LangPointer; } LANGHEADERENTRY; | 01 00 00 00 | Number of language in file (1) |
| | | 00 00 00 00 | Sign of language (0,English) |
| | | 0c 00 00 00 | Amount of word shift of beginning of the file |
| 0012–0039 | typedef struct tagUIStringRSInfoHeader { UINT32 LanguageID; UINT32 LangCharacteristic; UINT32 LangSize; INT32 StringPointer; INT32 RFU1; INT32 RFU2; INT32 RFU3; } StringRSInfoHeader; | 00 00 00 00 | Sign of language (0,English) |
| | | 14 00 00 00 | Spare |
| | | 0C 9B 00 00 | Words of file |
| | | 28 00 00 00 | Amount of word shift of beginning of the file |
| | | FF FF FF FF FF FF FF FF FF FF FF FF | Spare |
| 0040–0043 | INT32 COUNT | 7F 04 00 00 | Amount of vocabulary entries |
| 0044–xxxx | INT32 STRINGPOINTER | xx xx xx xx | Amount of data shift |
| xxxx–xxxx | const INT8 *string; | | Vocabulary entries with 0000 ending, retrieving amount of shift according to index |

| Amount of shift (byte) | Structure definition | Content (example) | Notation |
|---|---|---|---|
| 0000~0011 | typedef struct tagUIStringRSHeader {     UINT32 NumberOfLanguage;     LANGHEADERENTRY \     HeaderEntry[1]; } StringRSHeader; typedef struct tagUILangHeaderEntry {     UINT32 LangID;     INT32 LangPointer; } LANGHEADERENTRY; | 01 00 00 00 | Number of language in file (1) |
| | | 00 00 00 00 | Sign of language (0,English) |
| | | 0c 00 00 00 | Amount of word shift of beginning of the file |
| 0012~0039 | typedef struct tagUIStringRSInfoHeader {     UINT32 LanguageID;     UINT32 LangCharacteristic;     UINT32 LangSize;     INT32 StringPointer;     INT32 RFU1;     INT32 RFU2;     INT32 RFU3; } StringRSInfoHeader; | 00 00 00 00 | Sign of language (0,English) |
| | | 14 00 00 00 | Spare |
| | | 0C 9B 00 00 | Words of file |
| | | 28 00 00 00 | Amount of word shift of beginning of the file |
| | | FF FF FF FF FF FF FF FF FF FF FF FF | Spare |
| 0040~0043 | INT32 COUNT | 7F 04 00 00 | Amount of vocabulary entries |
| 0044~xxxx | INT32 STRINGPOINTER | xx xx xx xx | Amount of data shift |
| xxxx~xxxx | const INT8 *string; | | Vocabulary entries with 0000 ending, retrieving amount of shift according to index |

Fig. 1

METHOD FOR RETRIEVING VOCABULARY ENTRIES IN A MOBILE PHONE

BACKGROUND OF INVENTION

1. Field of the Invention

The present invention relates to a method for retrieving vocabulary entries, and more particularly, to a method for retrieving vocabulary entries expressed in different languages in a mobile phone.

2. Description of the Prior Art

For enhancing competitiveness of mobile phones for sales abroad, mobile phones supporting different languages are necessary. General speaking, mobile phones supporting different languages according to the prior art have a characteristic that each language has a resource file. In other words, a mobile phone has to establish a number of language resource files for each supported language. For example, if a mobile phone supports Chinese, English, German, French, and Russian, five languages, then the mobile phone has to establish five resource files for retrieving vocabulary entries. When the mobile phone retrieves vocabulary entries, the mobile phone first identifies what language is required, then retrieves vocabulary entries in the resource file corresponding to that language, and finally, reads data in the resource file.

According to the mobile phone supporting the number of languages to establish resource files for retrieving vocabulary entries, it is clear for a mobile phone programmer to know what languages the mobile phone supports. When a user requests adding more supported languages, the programmer only needs to establish resource files corresponding to the added languages. In the above-mention example, in addition to Chinese, English, German, French, and Russian, if the mobile phone has to support Japanese and Korean, the programmer will establish two resource files for retrieving vocabulary entries in the mobile phone. The method of retrieving entries is as said, first, identifying what language the mobile phone is operating in, then retrieving vocabulary entries in the resource file corresponding to the language, and finally, reading data in the resource file.

However, as the number of languages supported by the mobile phone increases, the management of the resource files becomes increasingly difficult. For example, if a user requests to change one of the vocabulary entries, the programmer has to change all resource files corresponding to the languages in the mobile phone. In said example, the programmer has to open the Chinese, English, German, French, Russian, Japanese, and Korean resource files, then search the to be changed vocabulary entries in the seven files. Thus, the management of the resource files is very inconvenient.

SUMMARY OF INVENTION

It is therefore a primary objective of the claimed invention to provide a method for retrieving vocabulary entries in a mobile phone to solve the above-mentioned problem.

According to the claimed invention, a method for retrieving vocabulary entries in a mobile phone is provided. The mobile phone includes a screen and a text file. The text file has a plurality of vocabulary entries. Each vocabulary entry is stored in a number of languages in the same text file. The method includes opening files according to the number of languages in the text file, storing vocabulary entries expressed in the same language in the same file, giving a same index for every vocabulary entry having the same meaning expressed in different languages, according to the index retrieving the vocabulary entry of the same meaning expressed in a different language in one of the files, and displaying the vocabulary entry on the screen.

These and other objectives of the present invention will no doubt become obvious to those of ordinary skill in the art after reading the following detailed description of the preferred embodiment that is illustrated in the various figures and drawings.

BRIEF DESCRIPTION OF DRAWINGS

FIG. 1 is a schematic view of BIN files according to the present invention.

DETAILED DESCRIPTION

Figure 2:
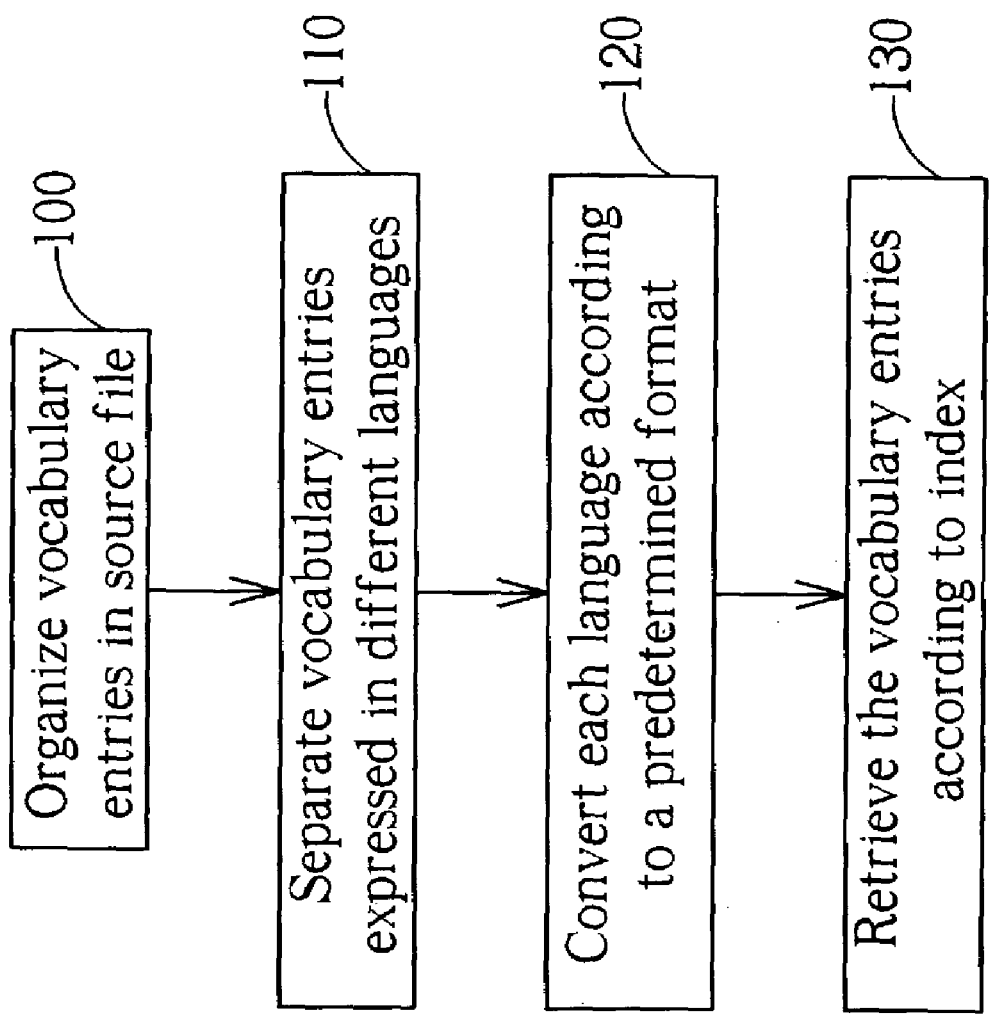
FIG. 2 is a flowchart of a retrieving method according to the present invention.

The present invention stores vocabulary entries of the same meaning expressed in different languages in a text file according to a predetermined format. When a programmer wants to add or delete vocabulary entries of one language, the programmer need only edit the contents of the text file. The purpose of storing vocabulary entries of the same meaning expressed in different languages in the text file according to the predetermined format is to conveniently separate vocabulary entries expressed in the same language from the text file and store vocabulary entries expressed in the same language in one file.

The vocabulary entries expressed in the different languages are all stored in a TEMP01.TXT file according to Unicode, version II. The format of the TEMP01.TXT file has strict regulations so that it is easy to separate each language from the TEMP01.TXT file. When separating each language from the TEMP01.TXT, the vocabulary entries of the same meaning expressed in different languages are given an index, and the index is stored in a TEMP02.H file.

The vocabulary entries of one language separated from the TEMP01.TXT file are stored in a TEMP03.TXT file. Then, the contents of the TEMP03.TXT file is converted to a 16-bit Unicode format and stored in a TEMP04.TXT file. Moreover, the contents of the TEMP04.TXT file according to the Unicode format is converted to binary code format and stored in a TEMP05.BIN file. The TEMP05.BIN file comprises an amount of word shift (or characters) of the beginning of the file, an amount of word shift of the beginning of the language, total words of the vocabulary entries, and an amount of shift according to the index. The contents of the TEMP05.BIN file are copied to data of a TEMP06.C file.

When retrieving the vocabulary entries, an amount of data shift of the vocabulary entries in the TEMP06.C file is found according to the index. The amount of data shift of the vocabulary entries is the sum of the amount of word shift of the beginning of the file, the amount of word shift of the beginning of the language, the total words of the vocabulary entries, and the amount of shift according to the index. The vocabulary entries of the same meaning expressed in different languages are retrieved by the index and the amount of data shift.

For example, a mobile phone provides vocabulary entries expressed in Chinese and English, and the vocabulary entries expressed in Chinese and English are stored in a stringsource.TXT file according to a predetermined format. The contents of the stringsource.TXT file is according to 8-bit Unicode, version II. The predetermined format is that vocabulary entries of the same meaning expressed in Chinese and English are separated by a slash, and vocabulary entries of different meanings are stored in other rows. In this way, the vocabulary entries expressed in Chinese and English are easily separated from the stringsoutce.TXT file according to the predetermined format, and the vocabulary entries expressed in Chinese and English are respectively stored in a Chinese.TXT file and an English.TXT file according to 16-bit Unicode.

When separating the vocabulary entries from the stringsource.TXT file according the predetermined format and converting to 16-bit Unicode stored in the Chinese.TXT file and the English.TXT file, vocabulary entries of the same meaning expressed in Chinese and English are given the same index(ID). The indexes are stored in a StringID.H file. The contents of the Chinese.TXT file and the English.TXT file according to Unicode format are converted to binary code format and stored in a Chinese. BIN file and an English.BIN file. For the structure of the Chinese.BIN file and the English.BIN file please refer to FIG. 1.

FIG. 1 is a schematic view of BIN files. As shown in FIG. 1, the structure of the Chinese.BIN file and the English.BIN file according to binary code comprises an amount of word shift of the beginning of the file (0000–0011), an amount of word shift of the beginning of the language (0012–0039), total words of the vocabulary entries (0040–0043), and an amount of shift according to the index (0044–xxxx). Then, the contents of the Chinese.BIN file and the English.BIN file are copied to data of a Chinese.C file and an English.C file, and separating and managing different languages is finished.

When retrieving the vocabulary entries expressed in Chinese, the amount of data shift of the vocabulary entries in the Chinese.C file is found according to the index. When retrieving the vocabulary entries expressed in English, the amount of data shift of the vocabulary entries in the English.C file is found according to the index. The amount of data shift of the vocabulary entries is the sum of the amount of word shift of the beginning of the file, the amount of word shift of the beginning of the language, the total words of vocabulary entries, and the amount of shift according to the index. That is, amount of data shift=amount of word shift of the beginning of the file+amount of word shift of the beginning of the language+total words of vocabulary entries+4*index.

The vocabulary entries of the same meaning expressed in different languages are retrieved by the index and the amount of data shift Please refer to FIG. 2. FIG. 2 is a flowchart of a retrieving method according to the present invention. The steps are as follows:

Step 100:
the vocabulary entries of the same meaning expressed in different languages are all stored in a text file according to a predetermined format, the text file being in 8-bit Unicode, version II;

Step 110:
the vocabulary entries of the same meaning expressed in different languages are separated from the text file, and the vocabulary entries expressed in the same language are stored in a same text file according to 16-bit Unicode. The vocabulary entries of the same meaning expressed in different languages are given a same index stored in an H file;

Step 120:
each text file storing the vocabulary entries expressed in the same language is converted to a structural file according to binary code, and the contents of the file according to binary code is copied to data of a C file;

Step 130:
the vocabulary entries are retrieved by the index of the H file and the amount of data shift of the C file.

In contrast to the prior art, the present invention stores the vocabulary entries having the same meaning expressed in different languages in a text file according a predetermined format, and when a programmer wants to add or delete vocabulary entries expressed in another language, the programmer need only change the contents of the text file. Therefore, the present invention provides a convenient and fast method to manage and retrieve vocabulary entries expressed in different languages.

Those skilled in the art will readily observe that numerous modifications and alterations of the device may be made while retaining the teachings of the invention.

Accordingly, the above disclosure should be construed as limited only by the metes and bounds of the appended claims.

What is claimed is:

1. A method for retrieving vocabulary entries in a mobile phone, the mobile phone comprising a screen, the method comprising:

uploading a first text file to the mobile phone, the first text file comprising a plurality of vocabulary entries, each vocabulary entry is stored in a number of languages in the first text file;

opening a plurality of second files according to the number of languages in the first text file;

storing vocabulary entries of a same language in one of the plurality of second files and storing vocabulary entries of different languages in different second files;

giving a same index for every vocabulary entry of a same meaning expressed in different languages, and giving different indexes for different vocabulary entries expressed in a same language;

retrieving a vocabulary entry of a same meaning expressed in a different language in one of the plurality of second files according to the index; and displaying the vocabulary entry on the screen;

the plurality of vocabulary entries are stored in the first text file according to Unicode, version II; and the plurality of vocabulary entries are stored in the plurality of second files after converting Unicode, version II to Unicode.

2. The retrieving method of claim 1 wherein the plurality of vocabulary entries is stored in the first text file according to a predetermined format.

3. The retrieving method of claim 1 further comprising converting the plurality of vocabulary entries stored in the plurality of second files from Unicode to binary code.

4. A method for retrieving vocabulary entries in a mobile phone, the mobile phone comprising a screen and a first text file, the first text file comprising a plurality of vocabulary entries, wherein the plurality of vocabulary entries is stored in the first text file according to Unicode, version II and each vocabulary entry is stored in a number of languages in the first text file, the method comprising:

opening a plurality of second files according to the number of languages in the first text file;

storing vocabulary entries of a same language in one of a plurality of second files and storing vocabulary entries of different languages in different second files, wherein the plurality of vocabulary entries are stored in the plurality of second files after converting Unicode, version II to Unicode;

giving a same index for every vocabulary entry of a same meaning expressed in different languages, and giving different indexes for different vocabulary entries expressed in a same language;

retrieving a vocabulary entry of a same meaning expressed in a different language in one of the plurality of second files according to the index; and displaying the vocabulary entry on the screen.

5. The retrieving method of claim 4 further comprising converting the plurality of vocabulary entries stored in the second files from Unicode to binary code.

* * * * *